Aug. 1, 1944.                    W. F. BOLDT                    2,354,791
                           TWO-WAY VALVE MECHANISM
                             Filed Feb. 5, 1943
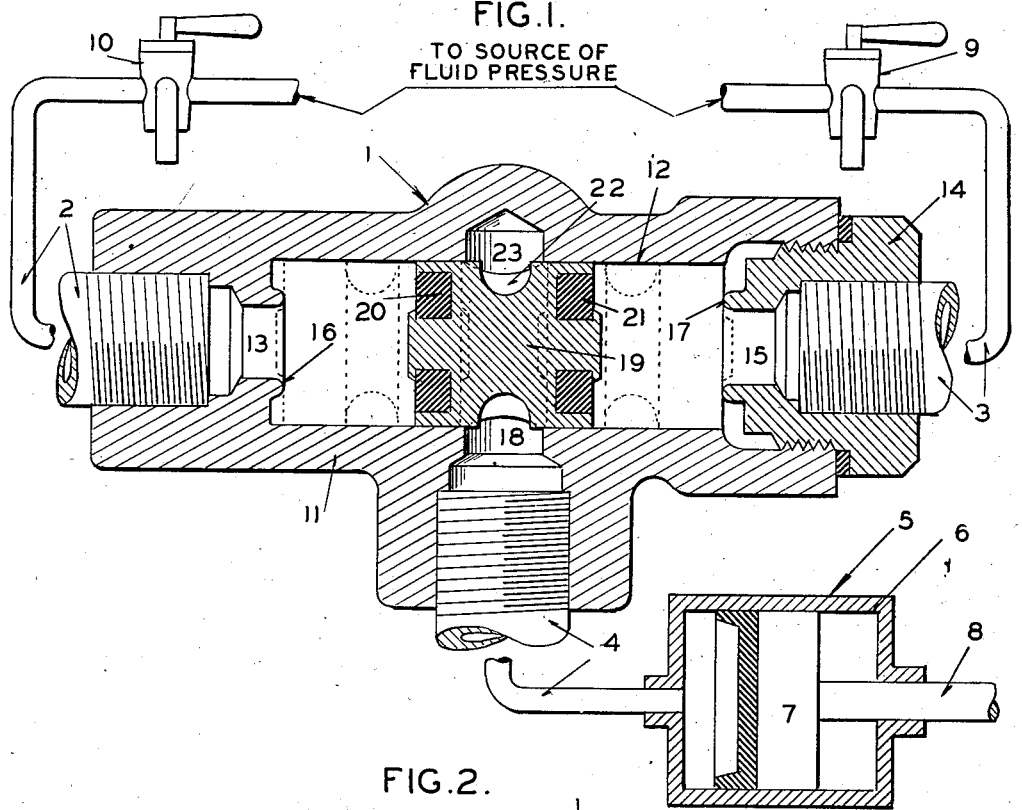
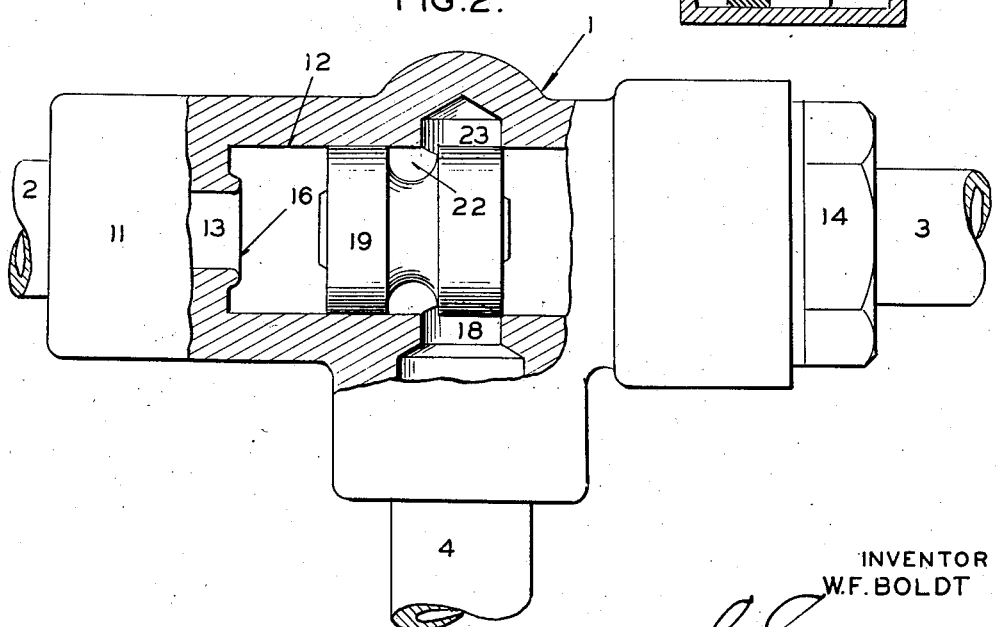
INVENTOR
W.F. BOLDT
BY
ATTORNEY Patented Aug. 1, 1944

2,354,791

UNITED STATES PATENT OFFICE 2,354,791

TWO-WAY VALVE MECHANISM

Werner F. Boldt, Clayton, Mo., assignor to Wagner Electric Corporation, St. Louis, Mo., a corporation of Delaware Application February 5, 1943, Serial No. 474,803

3 Claims. (Cl. 251—118)

My invention relates to valves and more particularly to an improved automatically-operated two-way valve mechanism employed in connecting a conduit to either one of two other conduits.

One of the objects of my invention is to so construct a two-way valve mechanism of the type embodying a piston that said piston will be prevented from becoming frictionally held in a position where the conduit which is to be placed in communication with either of two other conduits will be blocked.

Another object of my invention is to provide means in a two-way valve mechanism of the type referred to for insuring that the piston will be freely movable in its cylinder during the time it passes over a controlled opening in the cylinder wall in which fluid under pressure is present.

Other objects of my invention will become apparent from the following description taken in connection with the accompanying drawing in which Figure 1 is a schematic view of a fluid pressure system provided with a two-way valve mechanism embodying my invention, said mechanism being enlarged and shown in section; and Figure 2 is a view showing another position of the piston of the valve mechanism.

Referring to the drawing in detail, the two-way valve mechanism embodying my invention is adapted to be employed for automatically connecting one conduit with either of two other conduits. Thus by its use a device may be controlled by separate control valves with the use of only one conduit leading to the device to be controlled. In Figure 1 there is schematically shown an example of a fluid pressure system using the improved two-way valve mechanism generally indicated by the numeral 1. The valve is capable of automatically placing either conduit 2 or conduit 3 in communication with conduit 4 which leads to an actuating device 5 shown as a fluid motor and embodying a cylinder 6 in which is a piston 7 connected by a rod 8 to a mechanism to be actuated. The conduit 3 is connected to a source of fluid pressure, which may be either air or liquid, and interposed in said conduit is a control valve 9. The conduit 2 also leads to a source of pressure, which may be the same source of pressure to which conduit 3 is connected, and interposed in said conduit is a control valve 10. The control valves 9 and 10 may be of any suitable construction and have operative positions wherein fluid under pressure can flow from the source to the fluid motor; another position where the valve is closed and prevents any flow of fluid; and a third position where the fluid under pressure in the fluid motor 5 is permitted to be exhausted to atmosphere if air is used or returned to a sump if liquid is employed.

As shown, the two-way valve mechanism comprises a casing 11 provided with a cylinder 12 closed at one end and open at the other end. The closed end of the cylinder is connected to conduit 2 by a passage 13 and the open end of the cylinder is closed by a plug 14 having a passage 15 to which conduit 3 is connected. The inner ends of passages 13 and 15 are provided with surrounding valve seats 16 and 17, respectively. The central part of the cylinder has communicating therewith a port 18 to which the conduit 4 leading to the fluid motor 5 is connected.

Within the cylinder is a slidable valve element in the form of a piston 19 carrying rubber inserts 20 and 21 in its head. When positioned at the end of the cylinder where it engages valve seat 17 (dotted line position), this piston will permit free flow of fluid in both directions between conduits 2 and 4 and prevent any communication between either conduit 2 or 4 and conduit 3. When positioned at the opposite end of the cylinder where it engages valve seat 16 (dotted line position), the piston will permit free flow of fluid in both directions between conduits 3 and 4 and prevent communication between either conduit 3 or 4 and conduit 2.

The part of the two-way valve mechanism just described is of well-known construction and its operation is apparent. If the control valve 9 should be operated to admit fluid under pressure through conduit 3, this fluid will force the piston to the left end of the cylinder, if not already at such end. Fluid under pressure will then flow to the fluid motor and also be returned therefrom when the control valve permits exhaust. Likewise, when the control valve 10 is operated, piston 19 will be automatically moved to the right end of cylinder 12 and fluid under pressure will flow to the fluid motor either way between the two conduits 2 and 4. With such a valve as so far described it is possible that the control valves 9 and 10 (if hand and foot operated) may be so controlled at the same time that piston 19 will be in a position covering port 18 when release of fluid pressure from the motor is permitted. Under these conditions the piston will become "tied up" in such central position by the fluid pressure in port 18 acting on one side only of the piston, thus forcing it against the cylinder wall on the opposite side. This laterally acting force on the piston may even be great enough that the piston cannot move even though the valve may be mounted with its axis in a vertical position. With the port 18 blocked and the piston held in a continued blocking position the fluid pressure in the fluid motor will not be released in the desired rapid manner. Even the use of a fairly large clearance to permit leakage between the walls of the piston and cylinder will not be sufficient to permit a rapid enough release.

In order to overcome this possibility of the piston hanging up in the central position and blocking release of fluid under pressure from the fluid motor, I have provided means for insuring that the forces acting on the sides of the piston will at all times be balanced whenever the piston moves over part 18. This is accomplished by providing the piston with an annular groove 22 and establishing a recess 23 in the wall of the cylinder diametrically opposite port 18. This recess should have the same cross-sectional area as port 18 and is preferably made by the same drill that bores port 18. Such is easily accomplished by letting the drill pass across the cylinder and remove the material from the wall on the opposite side of the cylinder. Groove 22 should have such width in relation to the length of the piston that the distance from either end of the piston to the groove will be less than the diameters of port 18 and recess 23 (see Figure 2). Thus with these dimensions it is impossible for recess 23 to be completely blocked from communication with port 18. When the piston is in its central position, as shown in full lines in Figure 1, the groove will connect port 18 with recess 23. When the piston moves to a position where the groove is about to pass port 18 and recess 23 (Figure 2), the head of the piston will be ready to uncover the port and recess so that fluid pressure will still act on both sides of the piston and there will be no unopposed fluid pressure acting on the side of the piston.

It is seen that by means of the arrangement just described the piston is free at all times to move in the cylinder past port 18 and there will be no friction between the cylinder and piston caused by fluid pressure acting on only one side of the piston. The piston cannot assume any position where there are unbalanced lateral forces on its cylindrical surface. Thus it is practically impossible to obtain a condition wherein the piston will block port 18 and prevent exhaustion of fluid under pressure from the fluid motor 5. This would be the case even if the valve mechanism were mounted so that the axis of cylinder 12 were horizontal. With the piston freely movable it will be necessary that absolutely equal pressures be acting on the opposite ends of piston 19 for the piston to assume a blocking position. Such condition would be extremely rare in practice. The improvement is simple to embody in the valve mechanism and does not require additional over-all length thereof. It is also to be noted that the annular groove 22 and recess 23 do not in any way interfere with the guiding of the piston in the cylinder. Such would not be the case if groove 22 should be placed in the wall of the cylinder as then the piston might catch on the groove if the fit is sloppy, a desirable arrangement.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In valve mechanism for connecting one conduit to either of two other conduits, a cylinder having one of its ends communicating with one of said two conduits and its other end communicating with the other of said two conduits and being provided with a port intermediate its ends communicating with said one conduit, and a piston slidable in the cylinder to opposite sides of the port for automatically selectively connecting said two conduits with said one conduit as a result of fluid pressure acting on the piston and coming from the selected conduit of said two conduits, said cylinder being provided with a recess in its wall diametrically opposite the port and having an area at the cylinder wall substantially equal to that of said port at the cylinder wall and said piston being of such length and so provided with an annular groove in its surface that the recess will be in communication with the port in the event the piston should assume a position where the port is intermediate the ends of the piston.

2. In valve mechanism for connecting one conduit to either of two other conduits, a cylinder having one of its ends communicating with one of said two conduits and its other end communicating with the other of said two conduits and being provided with a port intermediate its ends communicating with said one conduit, a piston slidable in the cylinder to opposite sides of the port for automatically selectively connecting said two conduits with said one conduit as a result of fluid pressure acting on the piston and coming from the selected conduit of said two conduits, an annular groove intermediate the ends of the piston, and a recess in the cylinder wall diametrically opposite the port and having an area at the cylinder wall substantially equal to that of said port at the cylinder wall, the axial length of the piston surface between the groove and each end of the piston being such that the recess cannot be cut off from communication with the port.

3. In valve mechanism for connecting one conduit to either of two other conduits, a cylinder having one of its ends communicating with one of said two conduits and its other end communicating with the other of said two conduits and being provided with a port intermediate its ends communicating with said one conduit, a piston slidable in the cylinder to opposite sides of the port for automatically selectively connecting said two conduits with said one conduit as a result of fluid pressure acting on the piston and coming from the selected conduit of said two conduits, an annular groove intermediate the ends of the piston and a recess in the cylinder wall diametrically opposite the port and having a diameter substantially equal to that of said port, the axial length of the piston surface between the groove and each end of the piston being less than the diameter of the port so that the recess cannot be cut off from communication with said port by said piston.

WERNER F. BOLDT.